3,482,185
LOW IMPEDANCE THERMAL JOINT

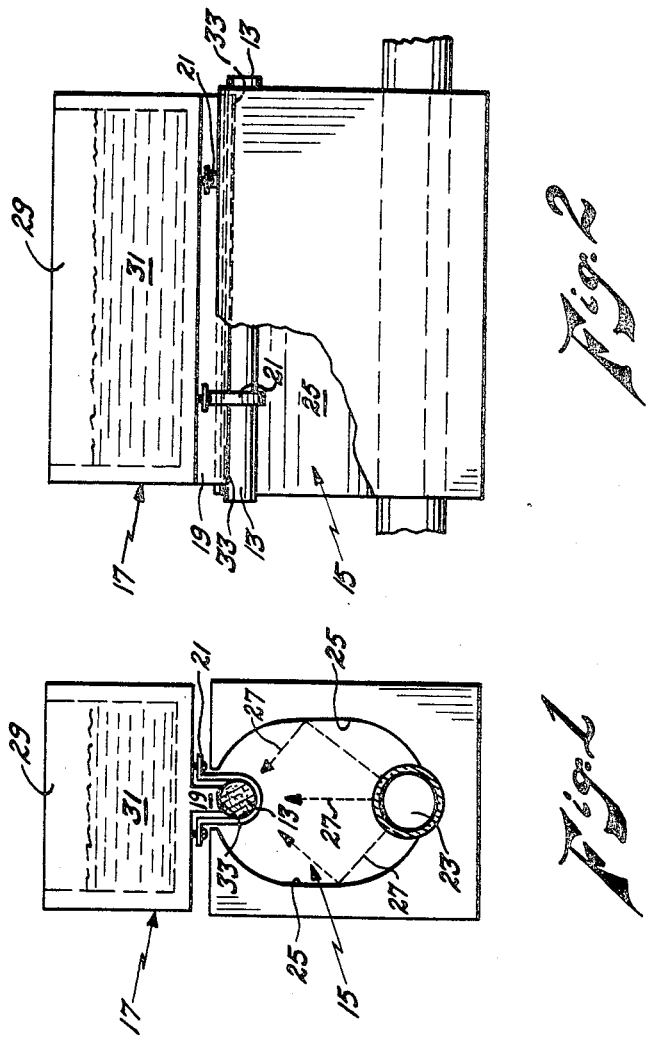

Richard G. Smith, Baltimore, and John L. Wentz, Randallstown, Md., assignors, by mesne assignments, to the United States of America as represented by the Secretary of the Air Force
Filed Oct. 25, 1966, Ser. No. 589,474
Int. Cl. H01s 3/02
U.S. Cl. 331—94.5            8 Claims

ABSTRACT OF THE DISCLOSURE

A low impedance thermal joint formed between a lasser rod and a heat sink. A curved surface on the heat sink is first tinned with a solder material and then an additional amount of molten solder is added thereto. The laser rod is placed in the molten solder and clamped in position by U-shaped clamps thereby forming an intimate joint which allows independent expansion and contraction of the joined elements.

---

This invention relates to an arrangement for providing maximum rate of heat transfer between two dissimilar materials subjected to a wide temperature differential and, more particularly, to a low impedance thermal joint at the position where a laser rod is in contact with its heat sink in order to maintain the laser rod at an extremely low fixed operating temperature for producing certain desired performance characteristics.

The laser, or optical maser as it is sometimes called, is an acronym for the phrase "light amplification by stimulated emission of radiation." Solid three-level lasers usually make use of ions of a transition metal, such as chromium dispersed in a transparent crystal. This invention is particularly concerned with the solid laser material ruby, which is crystalline aluminum oxide containing a fraction of a percent of trivalent chromium ions in place of aluminum ions. Lasers which utilize the solid laser material, such as ruby, to produce a narrow beam of coherent light are useful in optical radar and navigational systems. The high coherency of the light produced allows the signal to be separated from the "noise," such as sunlight, by the use of narrow band optical filters, and the narrow beam permits high resolution over great distances such as encountered in space.

The operation of a laser is based upon the fact that the atomic systems represented by the molecules of the laser material can exist in any of a series of discrete energy levels or states, the systems absorbing energy in the optical frequency range in going to higher state and emitting it when going to a lower state. In the case of ruby, three energy levels are utilized. The atomic systems are raised from the lower or ground level to the higher of the three levels by irradiation from a strong light source which need not be coherent but should preferably have a high concentration of energy in the shorter wavelengths. A radiationless transition then occurs from the highest state to an intermediate state. This is followed by a transition with photo emission from the intermediate state back to the ground state. It is the last transition that is of interest since this transition is the source of the coherent light produced by the laser.

The structure of a solid-state, three-level, optical maser can be especially simple. Essentially, it is a rod of material with parallel ends polished and coated to reflect light. Pumping radiation for raising the energy level of the laser to produce the desired photo emission enters through the transparent sides of the laser rod and may be supplied by a strong light source such as a xenon flash lamp which is positioned adjacent to the laser rod. Since rays of the light emitted by the flash lamp travels in all directions, a reflector which forms a substantially cylindrical chamber is provided to direct the light energy toward the laser rod. Along with the light energy, the the heat energy that is generated by the flash lamp also reaches the laser rod and is absorbed thereby. The absorbed heat must then be conducted away from the laser rod in order to allow operation when low temperatures are required to produce the desired performance characteristics.

Heretofore, the cooling means for maintaining the laser rod at the desired operating temperature usually includes a heat sink to which the laser rod is soldered or tightly clamped. These arrangements are generally satisfactory over the temperature range of normal laser operation and the thermal impedance at the joint between the laser rod and the heat sink is usually not high enough to cause difficulties.

However, under certain conditions in order to obtain the desired performance, it is necessary for the laser rod to be operated at a temperature of less than $-240°$ F. Because of its high thermal conductivity in this temperature range, the present invention utilizes oxygen free high conductivity copper for construction of the reservoir heat sink and liquid nitrogen at a temperature of $-320°$ F. is employed as the cooling medium. In order to maintain the laser rod at the extremely low temperatures required in the aforementioned operating conditions, it is necessary that the thermal impedance at the joint between the laser rod and the heat sink be reduced to the absolute minimum. A simple clamping technique which might be sufficient to cool a laser rod operating within normal temperature ranges would be entirely inadequate for maintaining the laser rod at the low temperature mentioned above because the required intimacy of contact between the rod and heat sink cannot be obtained from known machining or manufacturing methods. Even the introduction of a layer of thermal grease between the clamped surfaces will not produce a satisfactory joint because the grease loses its thermal characteristics when it becomes charred from exposure to the heat energy which is produced during operation of the laser.

Soldering techniques are sometimes employed to fixedly attach the laser rod to the heat sink by tinning both contact surfaces with a thin layer of the soldering material and applying sufficient heat to fuse the surfaces together. Although this technique produces an intimate contact between the attached members, the joint will eventually fail due to the excessive expansion stresses present when operating in the temperature range mentioned above which is required to produce the desired laser performance. A temperature of approximately $+320°$ F. is reached during the soldering operation using indium and, since the temperature of liquid nitrogen is $-320°$ F., the joint must remain intact over a 640° F. temperature variation.

A conventional soldered joint made in the manner described is not capable of absorbing the relative changes in length between the heat sink and the laser rod. These changes may be on the order of .005 inch and the heat transfer capabilities are substantially destroyed when the joint fails. Also contributing to the failure of the soldered joint is the charring of the flux which must be present in order to effect adhesion of the solder to the laser rod. Various other soldering techniques, such as ultrasonic soldering and vacuum depositing of thin layers of the noble metals on the rod prior to tinning, were employed for preparing the laser rod before attachment to the heat sink without producing a joint capable of remaining intact after a limited number of temperature cycles during operation of the laser. A thin layer of cobalt, which has a thermal coefficient of expansion approximately midway between that of copper and ruby, was deposited between the laser rod and the heat sink in an attempt to produce a satisfactory joint. However, the same negative results were obtained by this last named technique.

Accordingly, it is an object of the present invention to provide a low impedance thermal joint which will allow an extremely rapid rate of heat transfer between two joined elements of widely varying temperatures with a minimum of impedance to the transfer process.

Another object of the invention is to provide a technique for joining two objects together for the purpose of allowing the substantially complete transfer of heat energy from one to the other particularly over an extremely wide temperature range and a relatively large dimension change.

Still another object of the invention is to provide a technique for maintaining a laser rod at an extremely low operating temperature while the rod is being energized by a high energy pumping source such as a flash lamp.

A further object of the invention is to provide a low impedance thermal joint which permits relative expansion and contraction over an extended range of the joined members without separation or loss of intimate contact between the members.

Another further object of the invention is to provide a thermal joint between a laser rod and a heat sink which is of very low impedance and which provides for easy removal of the laser rod when required.

Another still further object of the invention is to provide a low impedance thermal joint that utilizes both soldering and clamping means for retaining a laser rod in contact with a heat sink. The application of solder to the contact surface of the heat sink provides a smooth, void-free surface against which the laser rod can be clamped.

These and other objects, features and advantages will become more apparent after considering the following detailed description taken in conjunction with the annexed drawings and appended claims.

In the drawings wherein like reference characters refer to like parts in the views;

FIGURE 1 is a cross-sectional view of a lasser assembly according to the invention showing the heat sink reservoir, laser rod, laser cavity, and flash lamp; and FIGURE 2 is a side elevation of the laser assembly with the laser cavity partially cut away to show the relative position of the various elements.

Referring now to the drawings, there is shown in FIGURE 1 a cross-sectional view of a laser assembly which includes a laser rod 13 preferably fabricated of ruby material. The laser rod 13 is positioned in the uppermost part of the laser cavity 15 in contact with the heat sink 17. A downwardly extending portion 19 of the heat sink 17 is provided with a machined surface which matches the curvature of the laser rod 13 so that there is substantially complete contact between the mating surface. A pair of U-shaped clamps 21 are positioned around the laser rod 13 and against the bottom surface of the heat sink 17 and the tightening of the clamps 21 causes the laser rod 13 to be forced against the downwardly extending portion 19 of the heat sink 17.

In the lowermost section of the laser cavity 15, there is positioned a flash lamp 23 preferably of tubular configuration and filled with xenon gas. The wall surfaces 25 of the laser cavity 15 are coated with a reflective substance so that the light rays 27 emitted from the flash lamp 23 are directed toward the laser rod 13 thereby raising the molecules of the rod to higher energy states. This causes the pumping light energy from the xenon lamp 23 to be converted into photo emission which produces a coherent light output as required for laser operation.

A certain portion of the energy from the flash lamp 23 is transferred to the laser rod 13 in the form of heat and raises the temperature of the rod to an undesirable and unacceptable level particularly when it is necessary to retain the rod at extremely low operating temperatures.

The heat sink 17 also includes a reservoir portion 29 for receiving a coolant fluid 31 such as liquid nitrogen. The primary concern of the present invention is to provide means for transferring the unwanted heat from the laser rod 13 to the coolant fluid 31 in the reservoir 29 of the heat sink 17. This indicates that the heat must flow across the thermal joint 33 and up the downwardly extending portion 19 to reach the coolant fluid 31 in the reservoir 29 of the heat sink 17 which is preferably fabricated of oxygen free high conductivity copper to allow highly efficient transfer of the heat generated during the operation of the laser. Once the heat reaches the portion 19 of the heat sink 17, the highly efficient heat transfer takes place and the heat passes into the coolant fluid 31 in the reservoir 29 and is thereby dissipated. Thus, the critical area of heat transfer is at the joint 33 where the laser rod 13 makes contact with the portion 19 of the heat sink 17 and the impedance to heat transfer in this area is preferably kept at an absolute minimum value.

In operation, the present invention provides a technique for retaining the laser rod 13 and the heat sink 17 in intimate contact with one another in order to form a joint having little or no impedance to the flow of heat from the rod to the downwardly extending portion 19 of the heat sink 17 and thence upward into the coolant fluid 31. In a preferred embodiment of the invention, a radius .002 inch larger than the radius of the laser rod 13 is machined along the length of the downwardly extending portion 19 of the heat sink 17. The heat sink 17 is then heated and the surface of the machined radius is tinned with indium solder. While still hot, the surface is wiped free of all flux and excess solder in order to prevent corrosion which could result from the presence of residual flux on the tinned surface. A small quantity of indium is melted on the tinned surface creating a puddle in the radius of the portion 19. The laser rod 13 is then preheated and laid in the puddle of melted indium. The two U-shaped clamps 21 are then drawn tightly against the heat sink 17 thereby squeezing out all of the indium except that which is trapped in microscopic voids between the laser rod 13 and the portion 19 of the heat sink 17. It is the filling of the voids which produces the intimate contact and forms the low impedance thermal joint having the necessary heat transfer properties.

The difference in the thermal coefficient of expansion between the ruby laser rod 13 and the high conductivity copper heat sink 17 does not become a problem because the laser rod 13 is held against the heat sink 17 by the clamps 21. Since the rod 13 is not actually soldered to the heat sink 17, it is free to expand and contract independently without breaking the intimate contact with the heat sink 17. The heat from the laser rod 13 passes across the joint 33 and through the copper of the heat sink 17, causing the coolant fluid liquid nitrogen in the reservoir 29 to boil, thus maintaining a constant temperature of −320° F. therein. This controls the temperature of the laser rod 13 so that it is held at approximately −240° F. which is in the range where it can be operated to produce the desired performance.

Although the invention has been illustrated and described in terms of a preferred embodiment thereof, it will be apparent to those skilled in the art that certain changes, alterations, modifications and substitutions can be made in the arrangement and location of the various elements without departing from the true spirit and scope of the appended claims.

Having thus set forth and disclosed the nature of our invention, what we claim and desire to secure by Letters Patent of the United States is:

1. In a laser device for producing coherent light, a laser rod longitudinally disposed in the uppermost part of a laser cavity, a flash lamp longitudinally disposed in the lowermost part of the laser cavity opposite said laser rod, said laser cavity being substantially cylindrical in shape and having reflective inner wall surfaces, the light rays from said flash lamp being reflected by the walls of said laser cavity toward the upper part thereof, and means for maintaining said laser rod at a low operating temperature comprising, a reservoir heat sink containing a coolant fluid therein, a downwardly extending portion from the base of said heat sink, said downwardly extending portion having a curved contact surface slightly larger in radius than said laser rod, said curved surface being tinned with a solder material, an additional quantity of solder material intermediate said tinned surface and said laser rod and a plurality of U-shaped clamps positioned around said laser rod for pressing said laser rod into intimate contact with the curved surface containing said additional solder to produce an intimate low impedance thermal joint between said laser rod and said heat sink to conduct the heat from the laser rod through the heat sink and into the coolant fluid for maintaining said laser rod at a low operating temperature while allowing independent expansion and contraction of the joined elements.

2. The laser device having the cooling means defined in claim 1 wherein the solder material is indium.

3. The laser device defined in claim 1 wherein the flash lamp in the laser cavity includes a xenon gas filled tube which provides the pumping radiation for raising the energy level of said laser rod.

4. The laser device having the cooling means defined in claim 1 wherein the coolant fluid which is contained in the reservoir heat sink and serves to absorb the heat conducted from the laser rod by the heat sink is liquid nitrogen.

5. A method of joining a laser rod to a heat sink for maintaining the laser rod at a low temperature during operation comprising the steps of forming a curved surface on the downwardly extending portion of the heat sink, tinning the curved surface with a solder material, adding an additional amount of solder in molten condition to the tinned surface to form a puddle thereon, preheating and placing the laser rod on the curved surface having the puddle of solder thereon, clamping the laser rod against the curved surface to squeeze out excess molten solder and to retain the laser rod against the heat sink, thereby filling microscopic voids in the area between the laser rod and the heat sink to form a low impedance thermal joint across which the heat from the laser rod is conducted to the heat sink while allowing independent expansion and contraction of the joined elements.

6. The method of joining a laser rod to a heat sink defined in claim 5 including the step of forming on the curved surface at the downwardly extending portion of the heat sink a radius .002 inch greater than the radius of the laser rod.

7. The method of joining a laser rod to a heat sink defined in claim 5 wherein the solder material used for tinning the curved surface and for adding the additional amount of molten material to the tinned surface is indium.

8. The method of joining a laser rod to a heat sink defined in claim 5 wherein there is included the additional step of wiping while hot all excess solder and flux which is present on the curved surface after it has been tinned and before the additional amount of molten solder is added to form the puddle thereon.

References Cited

UNITED STATES PATENTS 3,303,432  2/1967  Garfinkel et al. _____ 331—94.5
3,355,674  11/1967  Hardy _____ 331—94.5

JEWELL H. PEDERSEN, Primary Examiner

T. MAJOR, Assistant Examiner